(12) United States Patent
Ranftl et al.

(10) Patent No.: US 12,307,579 B2
(45) Date of Patent: *May 20, 2025

(54) DEEP GEOMETRIC MODEL FITTING

(71) Applicant: Intel Corporation, Santa Clara, CA (US)

(72) Inventors: Rene Ranftl, Munich (DE); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,463

(22) Filed: Oct. 6, 2023

(65) Prior Publication Data

US 2024/0161387 A1 May 16, 2024

Related U.S. Application Data

(63) Continuation of application No. 17/841,186, filed on Jun. 15, 2022, now Pat. No. 11,816,784, which is a (Continued)

(51) Int. Cl.
*G06N 20/00* (2019.01)
*G06N 3/045* (2023.01)
(Continued)

(52) U.S. Cl.
CPC .............. *G06T 15/10* (2013.01); *G06N 3/045* (2023.01); *G06N 20/00* (2019.01); *G06T 1/20* (2013.01); *G06T 3/08* (2024.01); *G06T 7/20* (2013.01); *G06T 7/593* (2017.01); *G06T 17/10* (2013.01); *G06N 3/084* (2013.01); *G06T 2207/20076* (2013.01); *G06T 2207/20081* (2013.01);
(Continued)

(58) Field of Classification Search
None
See application file for complete search history.

(56) References Cited

U.S. PATENT DOCUMENTS 5,548,662 A 8/1996 Kwon
6,018,696 A 1/2000 Matsuoka et al.
(Continued)

OTHER PUBLICATIONS

Axel Furlan, Free your camera: 3d indoor scene understanding from arbitrary camera motion, 2013 (month unknown), British Machine Vision Conference (BMVC), pp. 1-10, http://vision.stanford.edu/pdf/furlan13.pdf (Year: 2013).*
(Continued)

*Primary Examiner* — Joni Hsu
(74) *Attorney, Agent, or Firm* — Hanley, Flight & Zimmerman, LLC

(57) ABSTRACT

Systems, apparatuses and methods may provide for technology that generates, by a first neural network, an initial set of model weights based on input data and iteratively generates, by a second neural network, an updated set of model weights based on residual data associated with the initial set of model weights and the input data. Additionally, the technology may output a geometric model of the input data based on the updated set of model weights. In one example, the first neural network and the second neural network reduce the dependence of the geometric model on the number of data points in the input data.

20 Claims, 7 Drawing Sheets

50

| Generate, by a first neural network, an initial set of model weights based on input data | — 52 |

54 — Iteratively generate, by a second neural network, an updated set of model weights based on residual data associated with the initial set of model weights and the input data 56 — Output a geometric model of the input data based on the updated set of model weights 58 — Localize a plurality of cameras in a 3D environment based on the geometric model

Related U.S. Application Data continuation of application No. 15/933,510, filed on Mar. 23, 2018, now Pat. No. 11,393,160.

(51) Int. Cl.

| | |
|---|---|
| G06T 1/20 | (2006.01) |
| G06T 3/08 | (2024.01) |
| G06T 7/20 | (2017.01) |
| G06T 7/593 | (2017.01) |
| G06T 15/10 | (2011.01) |
| G06T 17/10 | (2006.01) |
| G06N 3/084 | (2023.01) |

(52) U.S. Cl.
CPC ............... *G06T 2207/20084* (2013.01); *G06T 2207/30248* (2013.01)

(56) References Cited

U.S. PATENT DOCUMENTS

| | | | |
|---|---|---|---|
| 7,213,008 | B2 | 5/2007 | Rising, III |
| 11,095,887 | B2 | 8/2021 | Kim |
| 11,393,160 | B2 | 7/2022 | Ranftl et al. |
| 11,816,784 | B2 | 11/2023 | Ranftl et al. |
| 2013/0230214 | A1 | 9/2013 | Arth et al. |
| 2013/0325775 | A1 | 12/2013 | Sinyavskiy et al. |
| 2015/0016777 | A1* | 1/2015 | Abovitz ............. G02B 27/0093 385/37 |
| 2018/0053056 | A1* | 2/2018 | Rabinovich .......... G06V 40/166 |
| 2018/0075309 | A1* | 3/2018 | Sathyanarayana ....... G06N 7/01 |
| 2018/0268256 | A1* | 9/2018 | Di Febbo ............. G06V 10/757 |
| 2018/0296281 | A1 | 10/2018 | Yeung et al. |
| 2018/0307925 | A1 | 10/2018 | Wisniowski et al. |

OTHER PUBLICATIONS

Fischler et al., "Random Sample Consensus: A paradigm for Model Fitting with Applications to Image Analysis and Automated Cartography," Communications of the ACM, Jun. 1981, 42 pages.
Hartley, "In Defense of the Eight-Point Algorithm," IEEE Transactions on Pattern Analysis and Machine Intelligence, Jun. 1997, 14 pages.
Torr et al., "The Development and Comparison of Robust Methods for Estimating the Fundamental Matrix," International Journal of Computer Vision, Sep. 1997, 30 pages.
Zhang, "Determining the Epipolar Geometry and its Uncertainty: A Review," International Journal of Computer Vision, Mar. 1998, 30 pages.
Hartley et al., "Multiple View Geometry in Computer Vision," Cambridge University Press, 2000, 673 pages.
Torr et al., "Milesac: A New Robust Estimator with Application to Estimating Image Geometry," Computer Vision and Image Understanding, Aug. 2000, 19 pages.
Torr, "Bayesian Model Estimation and Selection for Epipoplar Geometry and Generic Manifold Fitting," International Journal of Computer Vision, Oct. 2002, 27 pages.
Lowe, "Distinctive Image Features From Scale-Invariant Keypoints," International Journal of Computer Vision, Nov. 2004, 28 pages.
Chum et al., "Matching with PROSAC—Progressive Sample Consensus," CVPR, Jun. 2005, 7 pages.
Li, "Consensus Set Maximization With Guaranteed Global Optimality for Robust Geometry Estimation," ICCV 2009, Oct. 2009, 7 pages.
Grabner et al., "What Makes a Chair a Chair?" CVPR 2011, Jun. 2011, 8 pages.
Hoseinnezhad et al., "An m-estimator for High Breakdown Robust Estimation in Computer Vision," Computer Vision and Image Understanding, Aug. 2011, 6 pages.
Rublee et al., "ORB: An Efficient Alternative to SIFT or Surf," ICCV 2011, Nov. 2011, 8 pages.
Krizhevsky et al., "ImageNet Classification With Deep Convolutional Neural Networks," NIPS, Jan. 2012, 9 pages.
Geiger et al., "Are We Ready for Autonomous Driving? The KITTI Version Benchmark Suite," CVPR, Jun. 16-21, 2012, 8 pages.
Lebeda et al., "Fixing the Locally Optimized RANSAC," BMVC 2012, Sep. 2012, 11 pages.
Maas et al., "Rectifier Nonlinearities Improve Neural Network Acoustic Models," ICML Workshops, 2013, 6 pages.
Raguarm et al., "USAC: A Universal Framework for Random Sample Consensus," IEEE Transactions on Pattern Analysis and Machine Intelligence, Aug. 1, 2013, 17 pages.
Girshick et al., "Rich Feature Hierarchies for Accurate Object Detection and Semantic Segmentation," CVPR, Jun. 2014, 8 pages.
Yang et al., "Optimal Essential Matrix Estimation Via Inlier-Set Maximization," ECCV, Sep. 2014, 16 pages.
Lin et al., "Microsoft COCO: Common Objects in Context," ECCV, Sep. 2014, 15 pages.
Kingma et al., "A Method for Stochastic Optimization," ICLR, May 2015, 15 pages.
Long et al., "Fully Convolutional Networks for Semantic Segmentation," CVPR, Jun. 2015, 10 pages.
Tennakoon et al., "Robust Model Fitting Using Higher Than Minimal Subset Sampling," IEEE Transactions on Pattern Analysis and Machine Intelligence, Jun. 2015, 13 pages.
Mur-Artal et al., "A Versatile and Accurate Monocular SLAM System," IEEE Transactions on Robotics 2015, Oct. 2015, 15 pages.
Kendall et al., "PoseNet: A Convolutional Network for Real-Time 6-DOF Camera Relocalization," ICCV, Dec. 2015, 9 pages.
Agrawal et al., "Learning to See by Moving," ICCV, Dec. 2015, 12 pages.
Ionescu et al., "Matrix Back-Propagation for Deep Networks With Structured Layers," ICCV 2015, Dec. 2015, 9 pages.
Schonberger et al., "Structure-From-Motion Revisited," CVPR, Jun. 2016, 10 pages.
Detone et al., "Deep Image Homography Estimation," CoRR 2016, Jun. 2016, 6 pages.
Yi et al., "LIFT: Learned Invariant Feature Transform," ECCV, Oct. 2016, 16 pages.
Zhou et al., "Fast Global Registration," ECCV, Oct. 2016, 16 pages.
Chin et al., "Efficient Globally Optimal Consensus Maximisation With Tree Search," IEEE Transactions on Pattern Anaysis and Machine Intelligence, Nov. 2016, 9 pages.
Andrychowicz et al., "Learning to Learn by Gradient Descent by Gradient Descent," NIPS, Dec. 2016, 9 pages.
Kendall et al., "Geometric Loss Functions for Camera Pose Regression With Deep Learning," CVPR 2017, Feb. 2017, 10 pages.
Zaheer et al., "Deep Sets," NIPS 2017, Mar. 2017, 11 pages.
Torch Contributors, "PyTorch Documentation", Apr. 6, 2017, 236 pages.
Savinov et al., "Quad-Networks: Unsupervised Learning to Rank for Interest Point Detection," CVPR, Jul. 2017, 9 pages.
Knapitsch et al., "Tanks and Temples: Benchmarking Large-Scale Scene Reconstruction," ACM Transactions on Graphics, Jul. 2017, 13 pages.
Rocco et al., "Convolutional Neural Network Architecture for Geometric Matching," CVPR, Jul. 2017, 15 pages.
Uylanov et al., "Improved Texture Networks: Maximizing Quality and Diversity in Feed-Forward Stylization and Texture Synthesis," CVPR, Jul. 2017, 9 pages.
Brachmann et al., "DSAC—Differentiable RANSAC for Camera Localization," CVPR, Jul. 2017, 11 pages.
Qi et al., "Deep Learning on Point Sets for 3D Classification and Segmentation," CVPR, Jul. 2017, 19 pages.
Vongkulbhisal et al., "Discriminative Optimization: Theory and Applications to Point Cloud Registration," CVPR, Jul. 2017, 9 pages.
Ummenhofer et al., "DeMON: Depth and Motion network for learning monocular stereo," CVPR, Jul. 2017, 22 pages.
Nguyen et al., "Unsupervised Deep Homography: A Fast and Robust Homography Estimation Model," CoRR 2017, Sep. 2017, 8 pages.
Yi et al.,"Learning to Find Good Correspondences," arXiv:1711. 05971, Nov. 16, 2017, 13 pages.

(56) References Cited

OTHER PUBLICATIONS

Wikipedia, "Random Sample Consensus," URL:[en.wikipedia.org/wiki/random_sample_consensus], retrieved on Feb. 8, 2018, 8 pages.
Wikipedia, "NP-Hardness", URL:[en.wikipedia.org/wiki/NP-hardness], retrieved on Feb. 8, 2018, 3 pages.
Geiger et al., "The KITTI Vision Benchmark Suite," The Karlsruche Institute of Technology, URL:[cvlibs.net/datasets/kitti/eval_odometry.php], retrieved on Feb. 8, 2018, 5 pages.
United States Patent and Trademark Office, "Non-Final Office Action," issued in connection with U.S. Appl. No. 17/841,186, dated Dec. 29, 2022, 17 pages.
United States Patent and Trademark Office, "Final Office Action," issued in connection with U.S. Appl. No. 17/841,186, dated Apr. 17, 2023, 10 pages.
United States Patent and Trademark Office, "Notice of Allowance and Fee(s) Due," issued in connection with U.S. Appl. No. 17/841,186, dated Jul. 10, 2023, 5 pages.
United States Patent and Trademark Office, "Non-Final Office Action" issued in connection with U.S. Appl. No. 15/933,510, dated Nov. 16, 2021, 13 pages.
United States Patent and Trademark Office, "Notice of Allowance and Fee(s) Due," issued in connection with U.S. Appl. No. 15/933,510, dated Mar. 16, 2022, 7 pages.

\* cited by examiner

DEEP GEOMETRIC MODEL FITTING

CROSS-REFERENCE TO RELATED APPLICATIONS

This patent arises from a continuation of U.S. patent application Ser. No. 17/841,186 (now U.S. Pat. No. 11,816,784), filed on Jun. 15, 2022, which is a continuation of U.S. patent application Ser. No. 15/933,510 (now U.S. Pat. No. 11,393,160), filed on Mar. 23, 2018. U.S. patent application Ser. No. 17/841,186 and U.S. patent application Ser. No. 15/933,510 are incorporated herein by reference in their respective entireties.

TECHNICAL FIELD

Embodiments generally relate to geometric model fitting. More particularly, embodiments relate to the use of deep neural networks in geometric model fitting.

BACKGROUND

Computer vision applications may use geometric model fitting to support a wide variety of functions such as automated robot and/or vehicle navigation. For example, a computer vision application might define a mathematical problem that fits a geometric model to image data obtained from one or more cameras capturing the ambient environment. The geometric model may be, for example, a line, a polynomial, or a fundamental matrix (e.g., a 3×3 matrix that relates corresponding points in stereo images). The application may then attempt to solve the mathematical problem to determine the best fit of the model to the data.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Conventional solutions such as the Random Sample Consensus (RANSAC) family of algorithms, may solve geometric model fitting mathematical problems by randomly sampling the image data. As the minimum number of data points required to unambiguously define the model increases, the probability of sampling at least one outlier data point may rise exponentially. Accordingly, the RANSAC approach may be impractical for high-dimensional problems (e.g., problems with a large number of variables under consideration), particularly if the problem is a non-deterministic polynomial time (NP) hard maximum consensus problem that attempts to deal with outlier-contaminated data. Other solutions may be either impractically slow (e.g., global optimization of the maximum consensus problem) and/or unstable (e.g., embedding of a non-robust base estimator into a robust M-estimation framework).

Figure 1:
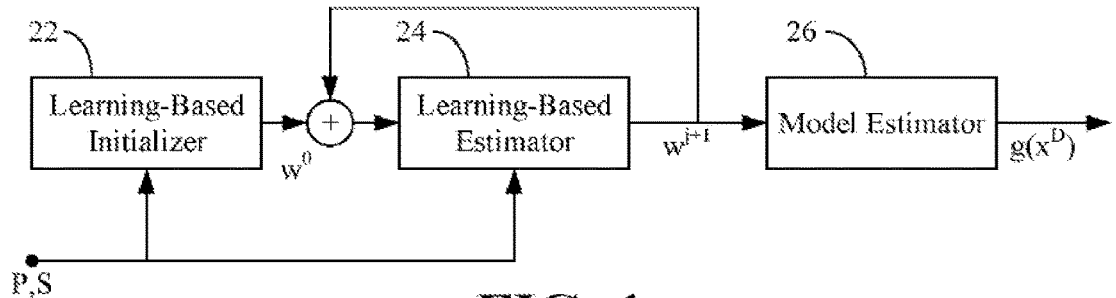
FIG. 1 is a schematic of an example of a pipeline architecture according to an embodiment.

Turning now to FIG. 1, a pipeline architecture 20 is shown in which a learning-based initializer 22 generates an initial set of model weights ($w^0$) based on input data (P), wherein the initial set of model weights may represent a starting point for solving a mathematical problem that fits a geometric model to the input data. The input data may be, for example, image data from one or more cameras capturing a scene and the geometric model may be, for example, a line, polynomial, fundamental matrix, and so forth. In the illustrated example, a learning-based estimator 24 iteratively generates an updated set of model weights ($w^{j+1}$) based on residual data associated with the initial set of model weights, the input data and optional side information (S). A model estimator 26 may output a geometric model ($g(x)^D$) of the input data based on the updated set of model weights.

As will be discussed in greater detail, the learning-based initializer 22 and the learning-based estimator 24 may use neural networks (e.g., deep neural networks/DNNs, convolutional neural networks/CNNs, etc.) to generate the model weights. Thus, the learning-based initializer 22 may include a first neural network that generates the initial set of model weights and the learning-based estimator 24 may include a second neural network that iteratively generates the updated set of model weights. Accordingly, one or more layers of the neural networks may operate independently on each point in the input data, which in turn enables the architecture 20 to avoid random sampling and reduce the dependence of the geometric model on the number of data points in the input data. The neural networks may also enable the architecture 20 to learn data regularities such as, for example, motion patterns associated with the input data and/or produce stable results more quickly than conventional solutions. The geometric model may be used to conduct higher level tasks such as, for example, localizing a plurality of cameras mounted to a vehicle or wheeled robot in a three-dimensional (3D) environment. The components of the architecture 20 may be implemented in logic instructions, configurable logic, fixed-functionality hardware logic, etc., or any combination thereof.

Preliminaries

Reference herein is made to a single element of the input data of dimensionality d as a point $p_i \in R^d$. Additionally, $P \in P = R^{N \times d}P$ is denoted as a pointcloud of dimensionality d that includes N (not necessarily distinct) points. Subscripts $(P)_i$ are used to refer to the i-th row of a matrix. Note that points can be either points in some metric space, or in the case of fundamental matrix and homography estimation, point correspondences (e.g., we have $p_i \in R^4$ in this case by concatenating the two image coordinates of putative correspondences $\tilde{p}_i \leftrightarrow \tilde{p}'_i$

Weighted Least-Squares

In many geometric model fitting problems, a (robust) homogeneous least-squares optimization problem arises:

$$\underset{x}{\text{minimize}} \sum_{i=1}^{N} \Phi(\|(A(P))_i \cdot x\|) \quad (1)$$

$$\text{subject to } \|x\| = 1.$$

where $x \in R^{d'}$ defines the model parameters $A: P \rightarrow R^{kN \times d'}$, $kN \geq d'$, $k > 0$ is a problem-specific mapping of the data points, and $\Phi: R \rightarrow R^+$ is a symmetric function with a unique minimum at 0.

By setting $\Phi(y) = y^2$, expression (1) reduces to a homogeneous least-squares problem that has/admits a closed-form solution (e.g., solves the problem in terms of functions and mathematical operations from a generally-accepted set). Popular examples of algorithms where optimization problems of this form arise are the normalized eight-point algorithm (e.g., for fundamental matrices), the Direct Linear Transform (DLT), and total least-squares fitting.

Consider hyperplane (e.g., a subspace whose dimension is one less than that of its ambient space) fitting as a simple example in which $(n^T, c)^T$ a hyperplane with normal n and intercept c. The goal of hyperplane fitting may be to infer $(n^T, c)^T$ from a given pointcloud P. To fit a hyperplane in a total least-squares sense, the following expression may be used:

$$A(P) \in R^{N \times d}, (A(P))_i = p_i^T - \frac{1}{N} \sum_{j=1}^{N} p_j^T. \quad (2)$$

Solving expression (1) with this definition and $\Phi(y) = y^2$ enables the plane to be extracted using the model extraction function g(x) that maps x to the model parameters:

$$g(x) = \left( x^T, -x \cdot \frac{1}{N} \sum_{i=1}^{N} p_i \right)^T = (n^T, c)^T \quad (3)$$

If the data is free of outliers, the least-squares solution may be close to the true solution, depending on the inlier noise distribution and the specific form of the problem. In practical applications, however, the correspondences are almost never completely correct. Indeed, there may be more outliers than inliers. Solving the estimation problem in a least-squares sense may yield incorrect estimates even in the presence of a single outlier.

One possible solution to robust geometric model fitting is to use a robust M-estimator as the loss function $\Phi$. The resulting optimization problem may not admit a closed-form solution in general. A practical way to approximately solve the optimization problem is by solving a sequence of reweighted least-squares problems.

$$x^{j+1} = \underset{x: \|x\|=1}{\text{argmin}} \sum_{i=1}^{N} w(p_i, x^j) \|(A(P))_i \cdot x\|^2, \quad (4)$$

where the exact form of the weights w depends on $\Phi$ and the geometric model at hand.

Returning to the hyperplane fitting example, assume that $w(p_i, x^j) = w_i = 1$ if $p_i$ is an inlier and $w(p_i, x^j) = w_i = 0$ otherwise. It is clear that given these weights, the correct model can be recovered in a single iteration of expression (4) by setting $$(A(P))_i = p_i^T - \frac{\sum_{j=1}^{N} w_j p_j^T}{\sum_{j=1}^{N} w_j} \quad (5)$$

$$\text{and } g(x) = \left( x^T, -x \cdot \frac{\sum_{j=1}^{N} w_j p_j}{\sum_{j=1}^{N} w_j} \right)^T. \quad (6)$$

Knowing the weights in advance, however, may be a "chicken-and-egg" problem. If the true model is known, it is trivial to separate inliers from outliers. On the other hand, if which points are inliers is known, it would be trivial to recover the true model (assuming that it can be recovered from the inlier set). In many instances, however, the weights may be estimated reasonably well using a deep network with appropriate structure as described herein.

Deep Model Fitting

Expression (4) may be considered an iteratively reweighted least-squares (IRLS) procedure with a complex, learned reweighting function. Since weights are being learned from data, at least one of the following assumptions may be used as a constraint: First, the input data admits regularity in the inlier and outlier distributions that can be learned. An example of this assumption would be an outlier distribution that is approximately uniform and sufficiently dissimilar to the inlier noise distribution. Second, the problem has useful side information (e.g., line fitting constraints, data correspondence, data correspondence likelihoods/descriptor matching scores) that may be integrated into the reweighting function. An example of this assumption would be using descriptor matching scores in fundamental matrix and homography estimation problems to indictate the likelihood that data points from different images correspond to one another (e.g., based on color). Third, the output space is a subset of the full space of model parameters. An example of this assumption would be fundamental matrix estimation in a specific scenario, such as for a camera mounted on a car or a wheeled robot.

Herein, the general structure of expression (4) is adopted, without assuming a simple form of the weight function w. Instead, expression (4) is parameterized using a deep network and the network weights are learned from data such that the overall algorithm leads to accurate estimates. The technology described herein can be understood as a metasolution that learns a complex and problem-dependent version of the IRLS procedure with an unknown cost function. This approach may be used to easily integrate side information into the problem, which can enhance and "robustify" the estimates. Moreover, the illustrated architecture 20 is able to recover accurate solutions even if the exact model cannot be estimated from the inliers (e.g., due to inlier noise).

Model Estimation

As already noted, a version of expression (4) may be formulated, where the weights are parametrized by a deep network that may be trained end-to-end. More particularly, the weight function may be redefined as $$w: \mathcal{P} \times S \times \mathbb{R}^d \to (\mathbb{R}_{<0})^N, \quad (7)$$

where $S \in S = \mathbb{R}^{N \times s}$ collects side information (e.g., line fitting constraints, descriptor matching scores) that may be available for each point. Because this function is defined globally, individual points may influence one another. Since w might be a highly complex function, it may be parameterized using a deep network with weights θ. With this parametrization, a single step in expression (4) may become:

$$x^{j+1} = \operatorname*{argmin}_{x:\ \|x\|=1} \sum_{i=1}^{N} \left(w(P, S, x^j; \theta)\right)_i \|(A(P))_i \cdot x\|^2,$$

To find a parametrization θ that leads to robust and accurate estimates, the explicit dependence on the correspondences and side information may be dropped for notational brevity. The result may be the matrix form $$x^{j+1} = \operatorname*{argmin}_{x:\ \|x\|=1} \|W^j(\theta)Ax\|^2, \quad (8)$$

where $(W^j(\theta))_{i,i} = \sqrt{w_i^j}$ collects the individual weights into a diagonal matrix.

Proposition 1. Let $X = U\Sigma V^T$ denote the singular value decomposition (SVD, e.g., factorization) of a matrix X. The solution $x^{j+1}$ of expression (8) is given by the right singular vector $v_{d'}$ corresponding to the smallest singular value of the matrix $W(\theta)A$.

This proposition is true given that expression (8) is a homogenous least-squares problem. Proposition 1 implies that a solution to the model fitting problem is recovered as $g(f(W(\theta)A))$, where $f(X) = v_{d'}$ and $g(x)$ is an appropriate function that maps from the SVD to the parameters of the geometric model. An example was already given in expression (6) for the case of hyperplane fitting. Further examples for different instances of the geometric model fitting problem are discussed below.

To learn the weights θ using gradient-based optimization, the gradient may be backpropagated through an SVD layer (e.g., using matrix calculus).

Proposition 2. Assume that the singular vectors are ordered according to the magnitude of their singular values $V = (v_1, v_2, \ldots, v_{d'})$ such that $v_{d'}$ is the singular vector corresponding to the smallest singular value. A backpropagation through $g(f(X))$ may be performed with $f(X) = v_{d'}$.

The gradient of g with respect to the input X may be given by $$\frac{\partial g}{\partial X} = U \left\{ 2\Sigma \left( K^T \circ \left( V^T \frac{\partial G}{\partial v_{d'}} \right)_{sym} \right) \right\} V^T, \quad (9)$$

where $K = \begin{cases} \frac{1}{\sigma_i^2 - \sigma_j^2}, & \text{if } i \neq j \\ 0, & \text{otherwise} \end{cases} \quad (10)$ and $\sigma_i$ denotes the i-th singular value.

Figure 2:
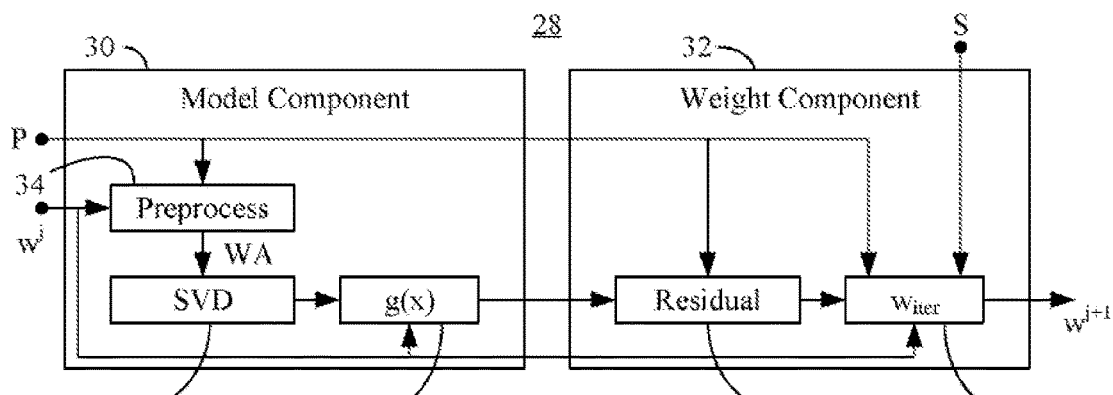
FIG. 2 is a block diagram of an example of a learning-based estimator according to an embodiment.

FIG. 2 shows an example of a learning-based estimator 28 that may be readily substituted for the learning-based estimator 24 (FIG. 1), already discussed. The illustrated learning-based estimator 28 generally includes a model component 30 and a weight component 32. The learning-based estimator 28 may take as inputs the points P, and a set of weights w. In the illustrated example, a preprocessor 34 constructs the matrix $W(\theta)A$ and a singular value decomposition (SVD) unit 36 factorizes the output of the preprocessor 34 into the product of three matrices (e.g., $UDV^T$, where the columns of U and V are orthonormal and the matrix D is diagonal with positive real entries). An extractor 38 ("g(x)") may perform a model extraction that yields an estimate of the geometric model given the input weights. For example, the extractor 38 might perform slight post-processsing calculations on the output of the SVD 36 to obtain an estimate of the model in a suitable format (e.g., line equation). The estimated model may then be used to estimate a new set of weights, based on the input points, side information, and the residuals of the currently estimated model.

Since the data presented to the weight component 32 may not exhibit any natural ordering, the illustrated weight component 32 is invariant to permutation of the input data. Thus, the weight component 32 may operate as a function approximator to integrate global information in a way that is independent of the actual ordering of the input data points. Additionally, because in most applications the number of input points is not known a priori, the illustrated weight component 32 is also able to process an arbitrary number N of input points. More particularly, the illustrated weight component 32 includes a residual analyzer 40 to identify the residual data associated with the initial set of weights. In this regard, the residual analyzer 40 may determine, for each data point, how far away the data point is from the estimated model. The weight component 32 may also include a neural network 42 ("$w_{iter}$") to iteratively generate an updated set of model weights based on the residual data and the input data.

In order to make the neural network 42 invariant to permutation of the input data, every operation in the network 42 itself is invariant to permutation. This is especially relevant for layers that operate across multiple data points. It can be shown that global average and max-pooling along dimension N fulfill this property. Instead of a single pooling layer that integrates global information, the neural network 42 may perform instance normalization after each layer:

$$(I(h))_i = \frac{h_i - \mu(h)}{\sqrt{\sigma^2(h) + \epsilon}}, \quad (11)$$

where $h_i$ is the feature vector corresponding to point i and the mean $\mu(h)$ as well as the variance $\sigma^2(h)$ are computed along dimension N:

$$\mu(h) = \frac{1}{N} \sum_{i=1}^{N} h_i, \quad \sigma^2(h) = \frac{1}{N} \sum_{i=1}^{N} (h_i - \mu(h))^2.$$

This operation integrates the distribution of global information across points and normalization into a single procedure. Since instance normalization may be entirely composed of permutation invariant operations on point features, the overall network 42 is invariant to permutations of the input points. Such an approach improves stability during training, especially in the high noise regime. For data with low signal-to-noise ratios, it may be beneficial to have multiple operations in the network that integrate data globally (e.g., in contrast to the PointNet architecture, where a single global integration step in the form of a pooling layer is proposed).

The learning-based estimator 28 may be implemented in logic instructions, configurable logic, fixed-functionality hardware logic, etc., or any combination thereof. In one example, the preprocessor 34, the extractor 38 and the residual analyzer 40 are model-specific and programmed in configurable logic in accordance with the particular application being deployed, the SVD unit 36 is implemented in fixed-functionality hardware logic, and the neural network 42 is implemented in logic instructions (e.g., via PYTORCH). The neural network of the learning-based initializer 22 (FIG. 1) may also be implemented in logic instructions. Other configurations may be used.

Figure 3:
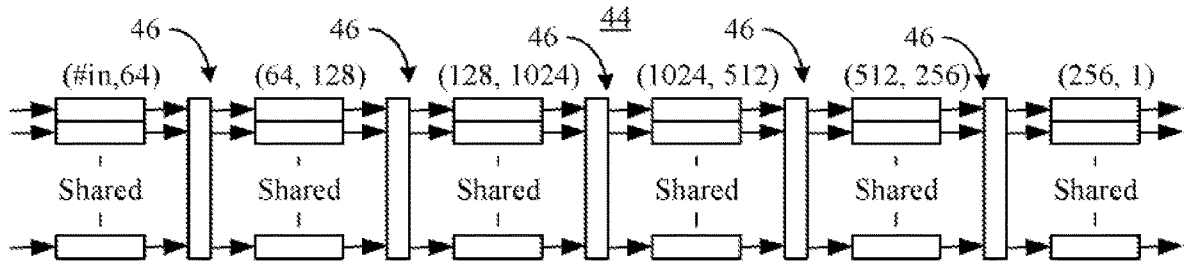
FIG. 3 is a block diagram of an example of a neural network according to an embodiment.

FIG. 3 shows a deep neural network 44 that may be readily substituted for the neural network 42 (FIG. 2), already discussed. The illustrated deep neural network 44 includes the repeated application of a linear layer, which acts independently for each data point. Each linear layer is followed by a leaky rectifier linear unit (ReLU) and an instance normalizer 46 that enables global communication between points. To produce strictly positive weights, the error estimator may be followed by a softplus (e.g., non-negative smooth approximation to the rectifier for least-squares estimation) activation.

Figure 4:
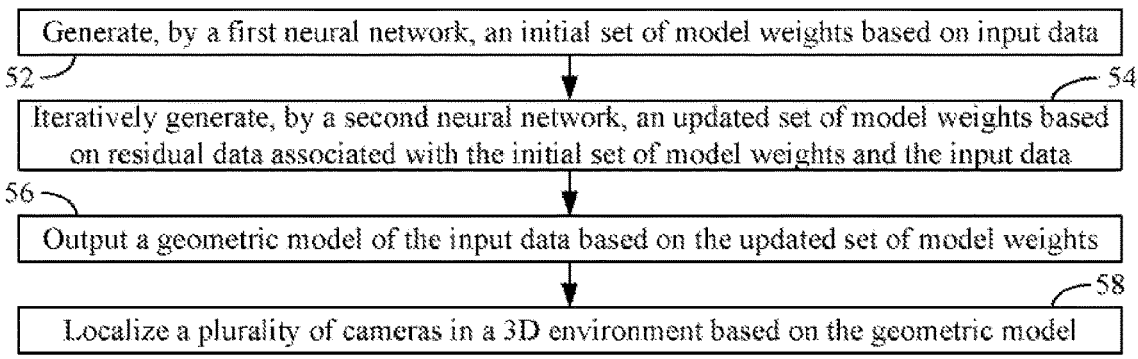
FIG. 4 is a flowchart of an example of a method of operating a computer vision apparatus according to an embodiment.

FIG. 4 shows a method 50 of operating a computer vision apparatus. The method 50 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for generating, by a first neural network, an initial set of model weights based on input data. Additionally, block 54 iteratively generates, by a second neural network, an updated set of model weights based on residual data associated with the initial set of model weights and the input data. Of particular note is that the second neural network may learn application-specific regularities in the input data such as vehicle and/or robot motion patterns associated with the input data. For example, if vehicle motion is dominantly forward motion rather than side-to-side motion or backward motion, the second neural network may gradually reduce the occurrence of model weights corresponding to side-to-side and/or backward motion over time. As a result, more accurate and robust estimates of epipolar geometry (e.g., intrinsic projective geometry between two views) may be achieved. Block 54 may also take into consideration side information such as, for example, line fitting constraints (e.g., permitted angles) and/or data correspondence likelihoods (e.g., matching scores) when iteratively generating the updated set of model weights. Moreover, the second neural network may generate the updated set of model weights for a predetermined number of iterations.

A geometric model of the input data may be output at block 56 based on the updated set of model weights. Because random sampling is not performed, the first neural network and the second neural network may reduce the dependence of the geometric model on the number of data points in the input data. As will be discussed in greater detail, the geometric model may include a hyperplane fit model, a fundamental matrix estimation model, a homography estimation model, etc., or any combination thereof. In general, the hyperplane fit model may be a shape in a geometric subspace (e.g., a line in a plane, a plane in a 3D volume, etc.) that fits the input data to an acceptable level of certainty. The fundamental matrix estimation may be a matrix that relates corresponding points in stereo images. Additionally, the homography estimation model might map planar surfaces in stereo images to one another.

Illustrated block 58 localizes a plurality of cameras in a 3D environment based on the geometric model. For example, if the cameras are stereoscopic cameras mounted to an autonomous vehicle and the geometric model is a fundamental matrix that relates corresponding points (e.g., the left headlight of an oncoming car) in stereo images, block 58 might use the fundamental matrix to determine the determine the relative position of the cameras, as well as the vehicle, in the ambient environment. In another example, the geometric model is a homography estimation model that enables an augmented reality (AR) application running on a smart phone to determine where a physical wall is located in a scene so that virtual content may be added to a reproduction of the wall. The camera localization information may be used to perform other higher level operations such as, for example, automated navigation, pose information, scene reconstruction (e.g., as the first stage in a reconstruction pipeline), etc.

Thus, the complete architecture may include an input weight estimator $w_{init}$, repeated application of the learning-based estimator, and a geometric model estimation on the final weights. For example, five consecutive applications (e.g., a predetermined number of iterations) of the learning-based estimator may strike an appropriate balance between accuracy and computational complexity. The sum of the losses of all intermediate stages may be considered the training loss. An overview of a complete forward pass is shown in the pseudo code below in Table I.

TABLE I

| Forward pass |
| --- |
| 1: Construct A(P) |
| 2: $w^0 \leftarrow$ softplus($w_{init}$(P, S)) |
| 3: for j = 0 to D do |
| 4:     X $\leftarrow$ diag($w^j$)A |
| 5:     U, $\Sigma$, V $\leftarrow$ svd(X) |
| 6:     Extract $x^{j+1} = v^d$ from V |
| 7:     Compute residuals to construct r from $g(x^{j+1})$ |
| 8:     $w^{j+1} \leftarrow$ softplus($w^j + w_{iter}$(P, S, r, $w^j$)) |
| 9: end for |
| 10: return $g(x^D)$ |

Where line "2:" provides the initial weights and line "8:" provides the solution to expression (8). The network may be implemented, for example, in the PYTORCH tool. In the applications discussed below, stochastic optimization may be used with an initial learning rate of $10^{-4}$ and a batch size of sixteen. The learning rate may be reduced every ten epochs by a factor of 0.8, with training being conducted for a total of 200 epochs.

Model Fitting Problems

The quantities for three different problem instances—general hyperplane fitting, fundamental matrix estimation, and homography fitting—may be specified. To specify a complete forward pass for a specific application, the following problem-depended components may be identified: The preprocessing step A(P), the model extractor g(x), and the residual $r(p_i, x)$. Note that these quantities may specialize the general meta-algorithm to the specific problem instance. While the exposition described herein is tailored to tasks involving homogenous least-squares problems, other types of estimators may be easily integrated as long as they are differentiable. In addition to the above functions, a training loss may be specified to be able to train the pipeline. This loss may be derived from the residual function r.

Hyperplane Fitting

To define training loss, 1000 inlier points may be sampled from a groundtruth model, wherein the point-to-plane distance with respect to these points is used as the loss:

$$\mathcal{L} = \frac{1}{N_{gt}} \sum_{j=0}^{D} \sum_{i=1}^{N_{gt}} r(p_i^{gt}, g(x^j)). \tag{13}$$

Since the network admits interpretable intermediate representations, a loss may be attached to all D intermediate results.

Fundamental matrix estimation. Robust fundamental matrix estimation may be performed based on a normalized 8-point algorithm. All coordinates may be rescaled to the interval $[-1, 1]^2$ and the preprocessing function may be defined as:

$$(A(P))_i = \text{vec}(T\hat{p}_i(T'\hat{p}_i')^T), \tag{14}$$

where $p_i = ((p_i)_1, (p_i)_2, 1)^T$ and $\hat{p}_i' = ((p_i)_3, (p_i)_4, 1)^T$ are homogeneous coordinates of the correspondences in the left and right image respectively, and T, $T_p$ are normalization matrices that center and scale the data.

We further have $$g(x) = T^T(x)_{3\times 3}T' = F, \tag{15}$$

where F denotes the fundamental matrix. This procedure may not explicitly enforce rank-deficiency of F in the forward pass, but experimental results indicate that the network learns to consistently estimate rank-2 matrices (i.e., matrices with a maximum number of two linearly independent column vectors or row vectors). The symmetric epipolar distance may be used as the residual function:

$$r(p_i, F) = |\hat{p}_i^T F \hat{p}_i'| \left( \frac{1}{\|F^T \hat{p}_i\|_2} + \frac{1}{\|F \hat{p}_i'\|_2} \right). \tag{16}$$

Fundamental matrices may not be easily compared directly due to their structure. Accordingly, the technology described herein compares the fundamental matrices based on how they act on a given set of correspondences. To this end, virtual pairs of correspondences are generated, wherein the virtual pairs of correspondences are inliers to the groundtruth epipolar geometry. More particularly, a grid of points may be generated in both images, with the points being reprojected to the groundtruth epipolar lines. The result may be virtual, noise-free inlier correspondences $p_i^{gt}$ that can be used to define a geometrically meaningful loss. The step can be understood as sampling the groundtruth epipolar geometry in image space. The training loss may again be given by an M-estimator.

Homography estimation. The basis for homography estimation may be formed by the Direct Linear Transform (DLT). Specifically, the following expressions may be used:

$$(A(P))_{2i-1:2i} = \begin{pmatrix} -\hat{p}_i^T & 0 & (\hat{p}_i')_1 \hat{p}_i^T \\ 0 & -\hat{p}_i^T & (\hat{p}_i')_2 \hat{p}_i^T \end{pmatrix} \tag{17}$$

and $g(x) = (T')_1(x)_{3\times 3}T = H.$ (18)

The symmetric transfer error may be used to compute residuals and the loss:

$$r(p_i, H) = \left\| \frac{(H\hat{p}_i)_{1:2}}{(H\hat{p}_i)_3} - \hat{p}_i' \right\| + \left\| \frac{(H^{-1}\hat{p}_i')_{1:2}}{H^{-1}\hat{p}_i'_3} - \hat{p}_i \right\|. \tag{19}$$

Results

Experiments may be conducted on successively harder problems: Hyperplane fitting on synthetic examples, fundamental matrix estimation in an automotive scenario, and general homography fitting.

Hyperplane fitting. Hyperplane fitting may be used as a canonical geometric model fitting problem, with the performance of controlled experiments that examine different aspects of the presented approach.

For both training and testing, a random dataset may be generated online. First, d points may be sampled uniformly at random in $[0, 1]^d$ and a hyperplane may be fitted to these points, which serves as the groundtruth model. Given the groundtruth model, inlier points may be generated by randomly sampling points and projecting them onto the hyperplane. Gaussian noise may be added with $\sigma = 0.005$ in normal direction to the inliers. To generate outliers, sampling may be conducted uniformly at random in $[0, 1]^d$. During training, instances consisting of 1000 points total may be generated with random outlier ratios between 0 and 90% (thus the model is not specialized to a specific outlier ratio). A single epoch may consist of 640 instances.

Figure 5A:
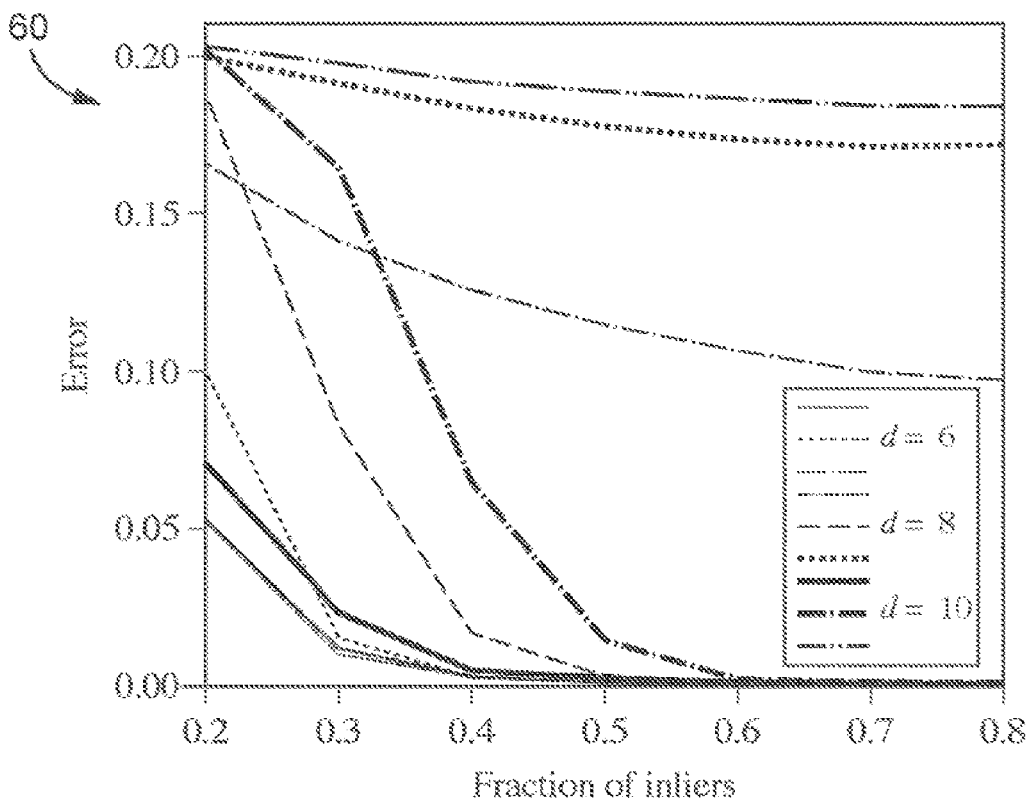
FIG. 5A is a comparative plot of an example of robustness in terms of problem dimension according to an embodiment.

FIG. 5A shows a comparative plot 60 in which the behavior with respect to the outlier rate is shown for different dimensionalities d of the fitting problem. The technology described herein is compared to RANSAC (dashed), which was run for 1000 iterations (roughly corresponding to a breakdown point of 50% outliers for dimensionality d=8) and an inlier threshold of 0.005. The accuracy is evaluated using the point-to-plane distance between the model and the known noise-free groundtruth points. It can be seen that the technology described herein (solid) may degrade more gracefully for higher outlier ratios as the dimensionality of the problem increases. Note that for RANSAC to achieve a similar accuracy, almost an order of magnitude more sampling iterations would be necessary for d=8, and about 50 times more iterations for d=10.

Figure 5B:
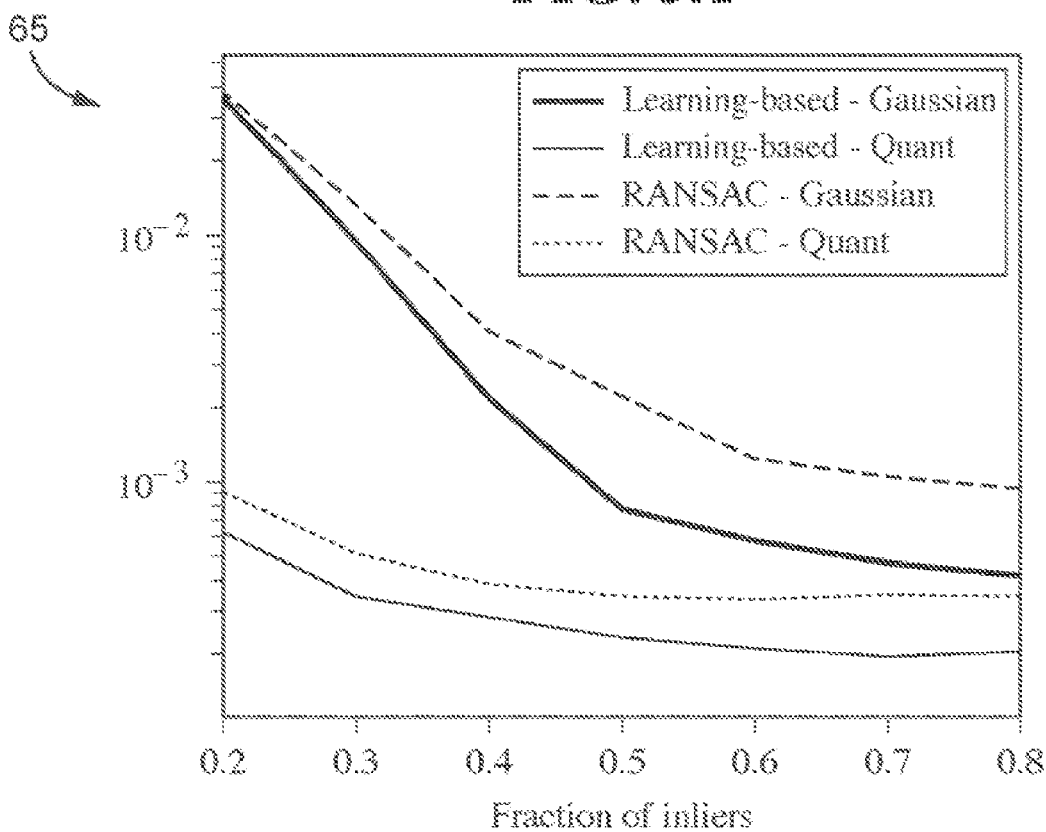
FIG. 5B is a comparative plot of an example of robustness in terms of noise distribution according to an embodiment.
Figure 5C:
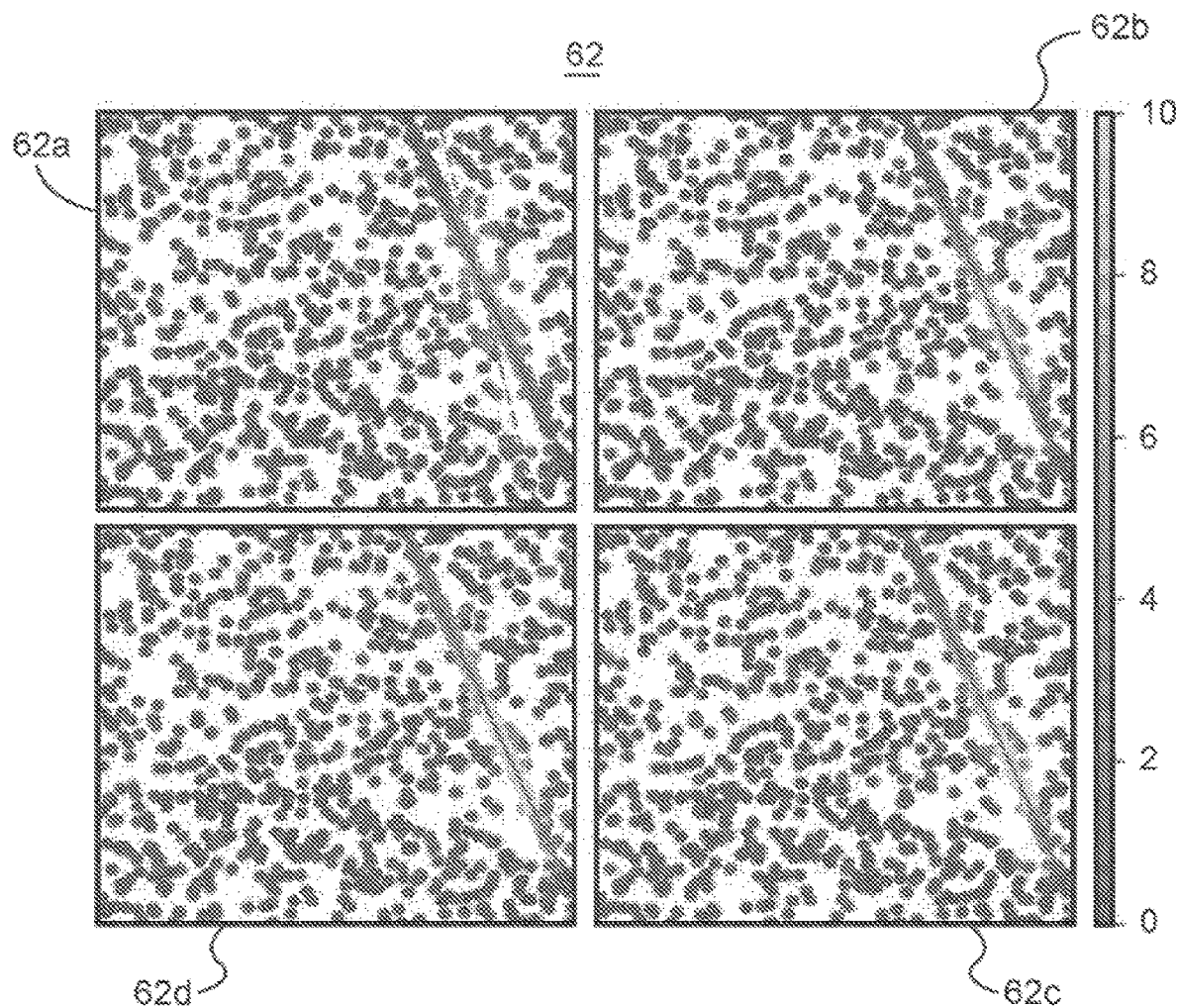
FIG. 5C is a set of plots of an example of accuracy at different pipeline stages according to an embodiment.

With continuing reference to FIGS. 5A and 5C, a set of plots 62 (62a-62d) show accuracy at different pipeline stages. The technology described herein is able to exploit the regularity of the data, which is for this example given by higher density regions for inliers. The plot 60 also shows the result of a PointNet architecture (dotted) that was trained to directly regress to the plane parameters. The PointNet architecture proved to be exceptionally difficult to train as the dimensionality of the problem increased. Accordingly, introducing geometric constraints may be helpful in tackling model fitting problems with deep networks.

The set of plots 62 show weights at different stages in the pipeline for d=2 and an outlier rate of 80%. From top left, clockwise, plot 62a for weights $w^0$, plot 62b for weights $w^1$, plot 62c for weights $w^3$, and plot 62d for weights $w^4$ (with corresponding estimates and groundtruth shown). The initial weights are already located around the true solution and yield an approximately correct estimate. As progress is made through the stages, the weights become progressively more concentrated around inlier points leading to progressively more accurate estimates.

Turning now to FIG. 5B, robustness to non-Gaussian inlier noise was further investigated. The data points were binned to a grid that is resolved to a cell size of 1/100 of the total extent of the points and train a model for d=2. The test set is generated analogously. A comparative plot 64 demonstrates that the technology described herein yields more accurate results independent of the inlier noise distribution when compared to RANSAC.

Fundamental matrix estimation. The KITTI (Karlsruhe Institute of Technology and Toyota Technological Institute) odometry dataset may be used to evaluate the technology described herein for fundamental matrix estimation. The dataset consists of twenty-two distinct driving sequences, eleven of which have publicly available groundtruth odometry. This dataset may be well suited for deep geometric model fitting as it exhibits regularity: the epipolar geometries of consecutive frames are typically governed by dominant forward motion.

Figure 6:
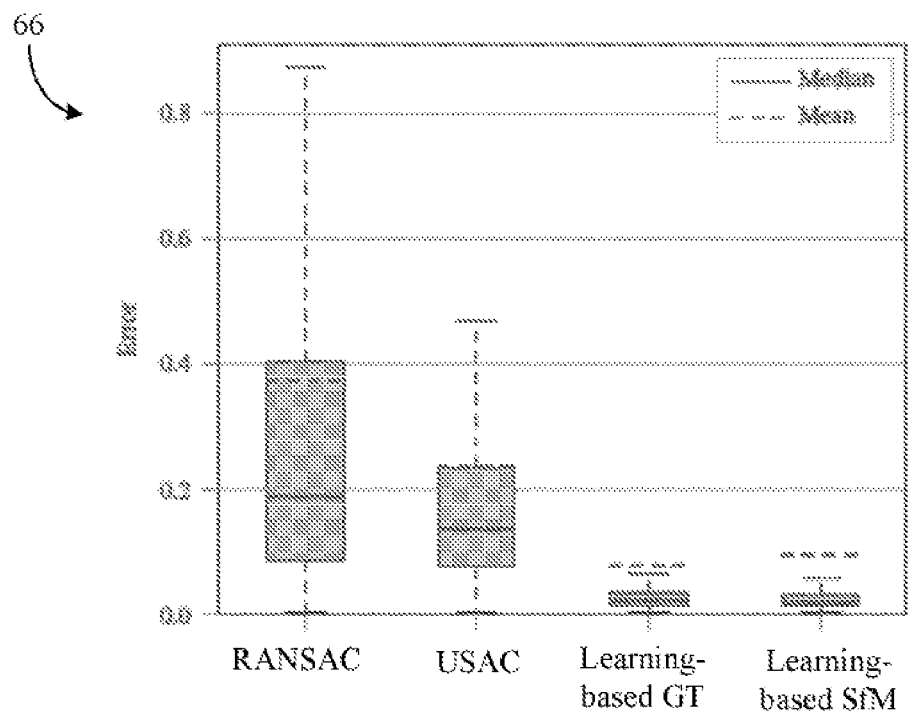
FIG. 6 is a comparative plot of an example of squared Sampson error according to an embodiment.

Turning now to FIG. 6, a comparative plot 66 demonstrates results obtained from the KITTI odometry dataset. More particularly, a scale-invariant feature transform (SIFT) may be used to extract putative correspondences from consecutive frames in the dataset. To faciliate efficient batch training, the number of keypoints per image pair may be constrained to 1000, by randomly sampling a set of keypoints if the detected number is larger. Random keypoints may be replicated if the number of detected keypoints is smaller than 1000. The network may be trained on two different datasets. The first dataset is sequences 00 to 05, which include known groundtruth poses (e.g., "Learning-based GT"). In order to show the practical applicability of deep geometric model fitting, the pipeline may additionally be trained on sequences 11 to 22, which do not have publicly available groundtruth poses. A structure-from-motion (SfM) pipeline may be run on the sequences, followed by the extraction of cameras that serve as proxy groundtruth (e.g., "Learning-based SfM").

Sequences 06 to 10, which include groundtruth poses, may be used for testing. A comparative plot 66 shows statistics of the squared Sampson error with respect to inlier correspondences (e.g., correspondences that are within 0.1 px error to the groundtruth epipolar geometry). Each box shows upper and lower quartiles. Whiskers show 1.5 times the interquartile range. The learning-based technology described herein may be compared to the OpenCV implementation of RANSAC in combination with the eight-point algorithm and universal RANSAC (USAC) approach in combination with a seven-point algorithm. Attempts were also made to train a naive deep network to directly regress to the coefficients of a fundamental matrix. This approach failed because the network did not learn to enforce rank deficiency of the estimate.

Results indicate that the error of the proposed approach is both the closest to zero and the least spread out. Thus, the technology described herein is able to learn a model that is significantly more accurate in all error statistics. Simply put, the learned estimator is both more accurate and more robust to outliers. Moreover, training from SfM proxy groundtruth yields a model that is only marginally less accurate than training from exact groundtruth data, which reinforces the general applicability of the learning-based approach described herein. Furthermore, the learning-based technology shows practical run-times of on average 25 ms per instance. The model may also be trained on proxy groundtruth using other datasets.

Homography estimation. An evaluation protocol based on the MS-COCO (MICROSOFT-Common Objects in Context) dataset may be followed. For each image, random patches of size 256×256 pixels may be extracted. A groundtruth homography may be generated by perturbing the corners of the reference patch uniformly at random by up to 64 pixels. The inverse homography may be used to warp the reference image and a second (warped) patch may be extracted from the same location.

The generation of 10000 training pairs may then be conducted, followed by the use of ORB (Oriented Features from Accelerated Segment Test/FAST and Rotated Binary Robust Independent Elementary Features/BRIEF) features, the Hamming distance and a ratio test to extract putative matches. Pairs with less than 100 matches may be discarded, with a total of 500 points (as described in the preceding section) being used to enable batching. Matching scores may be used as side information. During training, extreme homographies might arise. Accordingly, the maximal distances in expression (16) may be clamped to the interval [−64, 64].

Figure 7:
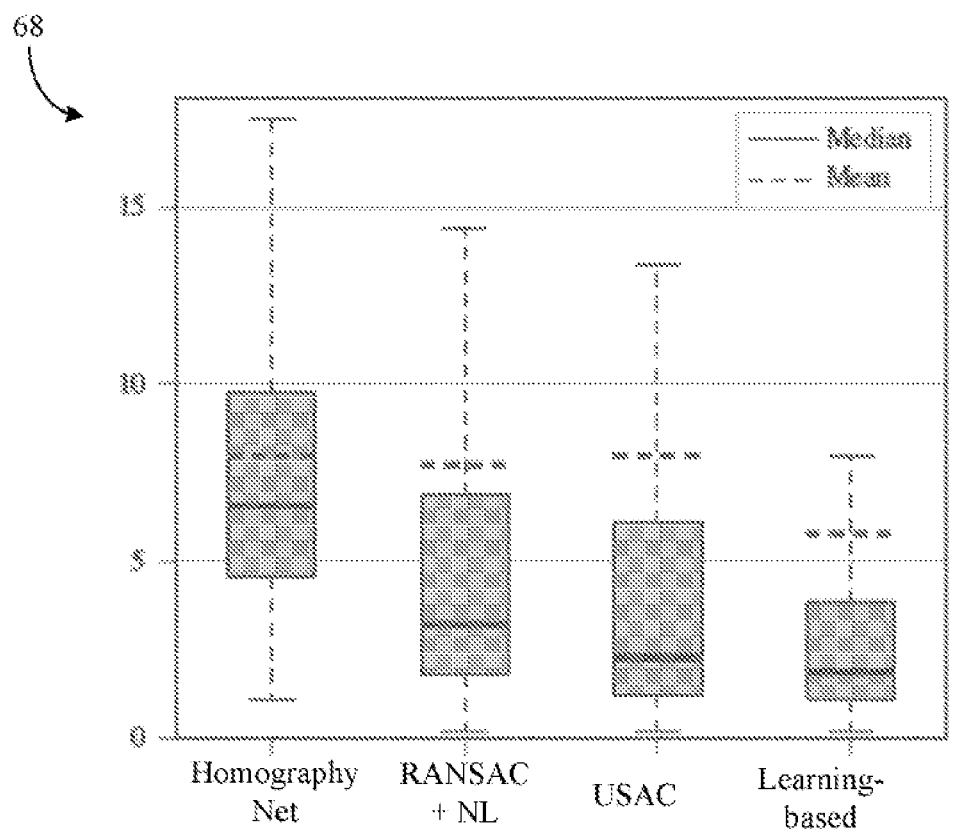
FIG. 7 is a comparative plot of an example of average corner error according to an embodiment.

Turning now to FIG. 7, a comparison may be made to the technology described herein ("Learning-based") and a deep network for homography estimation ("HomographyNet"), an OpenCV-based estimator that consists of RANSAC followed by a non-linear refinement stage ("RANSAC-NL"), and USAC. To train the baseline network, a deep image homography estimation protocol may be followed. The test set consists of 5000 images from the MS-COCO test set that where generated in the same way as the training set.

A comparative plot 68 shows statistics of the average corner error in the estimated homographies. The present approach outperforms both HomographyNet and the SAC baselines. Note that the result of HomograpyNet has a significantly higher spread of errors than all other approaches. This is clearly the hardest dataset so far, since there is almost no regularity in the data. Nonetheless, the proposed approach is able to extract useful information from the joint location of points and the side information, leading to more accurate results than RANSAC-type solutions, despite the fact that both operate on the same set of putative matches.

Figure 8:
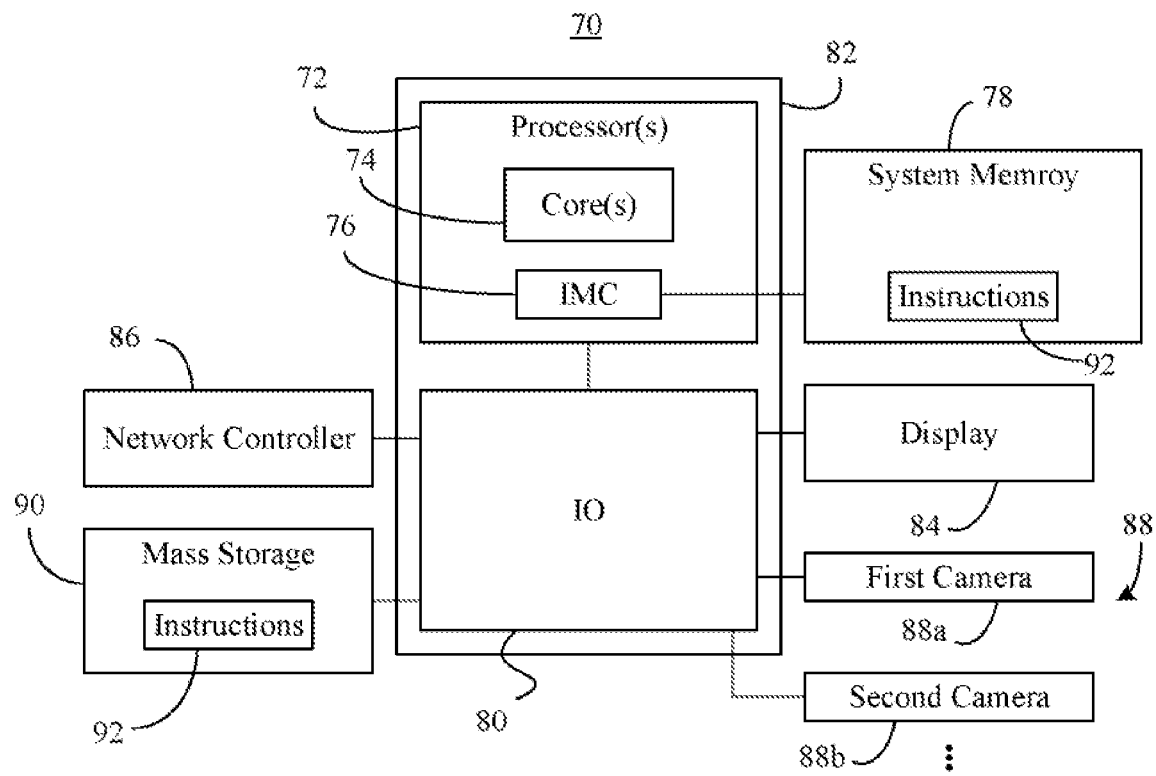
FIG. 8 is a block diagram of an example of a computing system according to an embodiment.

Turning now to FIG. 8, a computer vision system 70 is shown. The system 70 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 70 includes one or more processors 72 (e.g., host processor(s), central processing unit(s)/CPU(s)) having one or more cores 74 and an integrated memory controller (IMC) 76 that is coupled to a system memory 78.

The illustrated system 70 also includes an input output (IO) module 80 implemented together with the processor(s) 72 on a semiconductor die 82 as a system on chip (SoC), wherein the IO module 80 functions as a host device and may communicate with, for example, a display 84 (e.g., touch screen, liquid crystal display/LCD, light emitting diode/LED display), a network controller 86 (e.g., wired and/or wireless), a plurality of cameras 88 (88a, 88b) to generate input data (e.g., image data) and mass storage 90 (e.g., hard disk drive/HDD, optical disk, solid state drive/SSD, flash memory). The processor(s) 72 may execute instructions 92 retrieved from the system memory 78 and/or the mass storage 90 to perform one or more aspects of the method 50 (FIG. 4).

Thus, execution of the instructions 92 may cause the computer vision system 70 to generate, by a first neural network, an initial set of model weights based on the input data from the cameras 88, iteratively generate, by a second neural network, an updated set of model weights based on residual data associated with the initial set of model weights and the input data, and output a geometric model of the input data based on the updated set of model weights. The input data, the initial set of model weights and/or the updated set of model weights may be stored to one or more of the system memory 78 or the mass storage 90. In one example, execution of the instructions 92 also causes the computer vision system 70 to localize the cameras 88 in a 3D environment based on the geometric model. Indeed, the second neural network may learn one or more data regularities such as motion patterns (e.g., dominant forward movement) associated with the input data.

The geometric model may be a hyperplane fit model, fundamental matrix estimation model, homography estimation model, etc., or any combination thereof. The first neural network and the second neural network may reduce the dependence of the geometric model on the number of data points in the input data. Additionally, the updated set of model weights may be generated for a predetermined number of iterations and further based on side information such as line fitting constraints, matching scores, and so forth.

Figure 9:
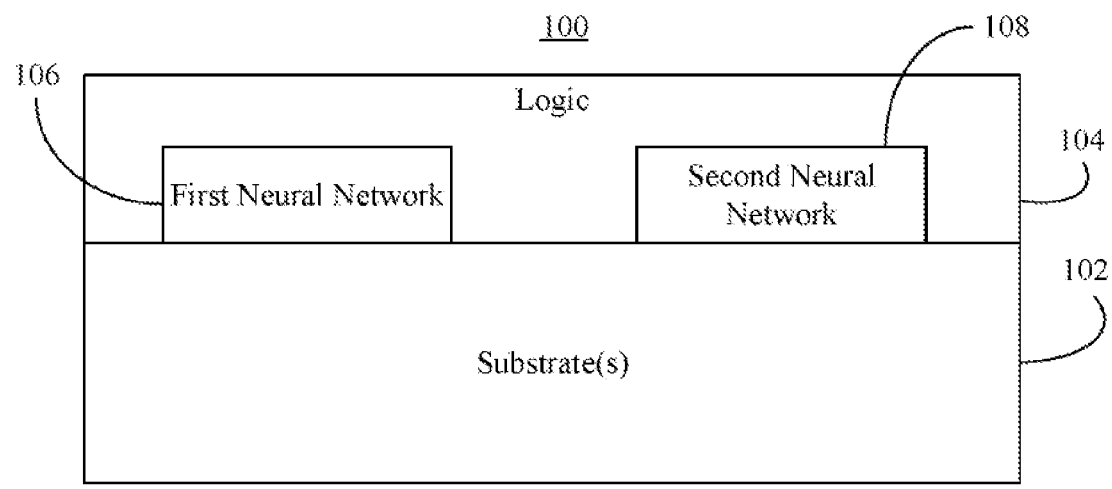
FIG. 9 is an illustration of an example of a semiconductor package according to an embodiment.

FIG. 9 shows a semiconductor package apparatus 100. The apparatus 100 may be readily substituted for the semiconductor die 82 (FIG. 8), already discussed. The illustrated apparatus 100 includes one or more substrates 102 (e.g., silicon, sapphire, gallium arsenide) and logic 104 (e.g., transistor array and other integrated circuit/IC components) coupled to the substrate(s) 102. The logic 104 may be implemented at least partly in configurable logic or fixed-functionality hardware logic. The illustrated logic 104 includes a first neural network 106 and a second neural network 108. The logic 104 may generally implement one or more aspects of the method 50 (FIG. 4). Accordingly, the logic 104 may generate, by the first neural network 106, an initial set of model weights based on input data, iteratively generate, by the second neural network 108, an updated set of model weights based on residual data associated with the initial set of model weights and the input data, and output a geometric model of the input data based on the updated set of model weights. Additionally, the logic 104 may localize a plurality of cameras in a three-dimensional environment based on the geometric model. Indeed, the second neural network 108 may learn one or more data regularities such as motion patterns (e.g., dominant forward movement) associated with the input data.

As already noted, the geometric model may be a hyperplane fit model, fundamental matrix estimation model, homography estimation model, etc., or any combination thereof. The first neural network 106 and the second neural network 108 may reduce the dependence of the geometric model on the number of data points in the input data. Additionally, the updated set of model weights may be generated for a predetermined number of iterations and further based on side information such as line fitting constraints and/or matching scores.

In one example, the logic 104 includes transistor channel regions that are positioned (e.g., embedded) within the substrate(s) 102. Thus, the interface between the logic 104 and the substrate(s) 102 may not be an abrupt junction. The logic 104 may also be considered to include an epitaxial layer that is grown on an initial wafer of the substrate(s) 102.

Figure 10:
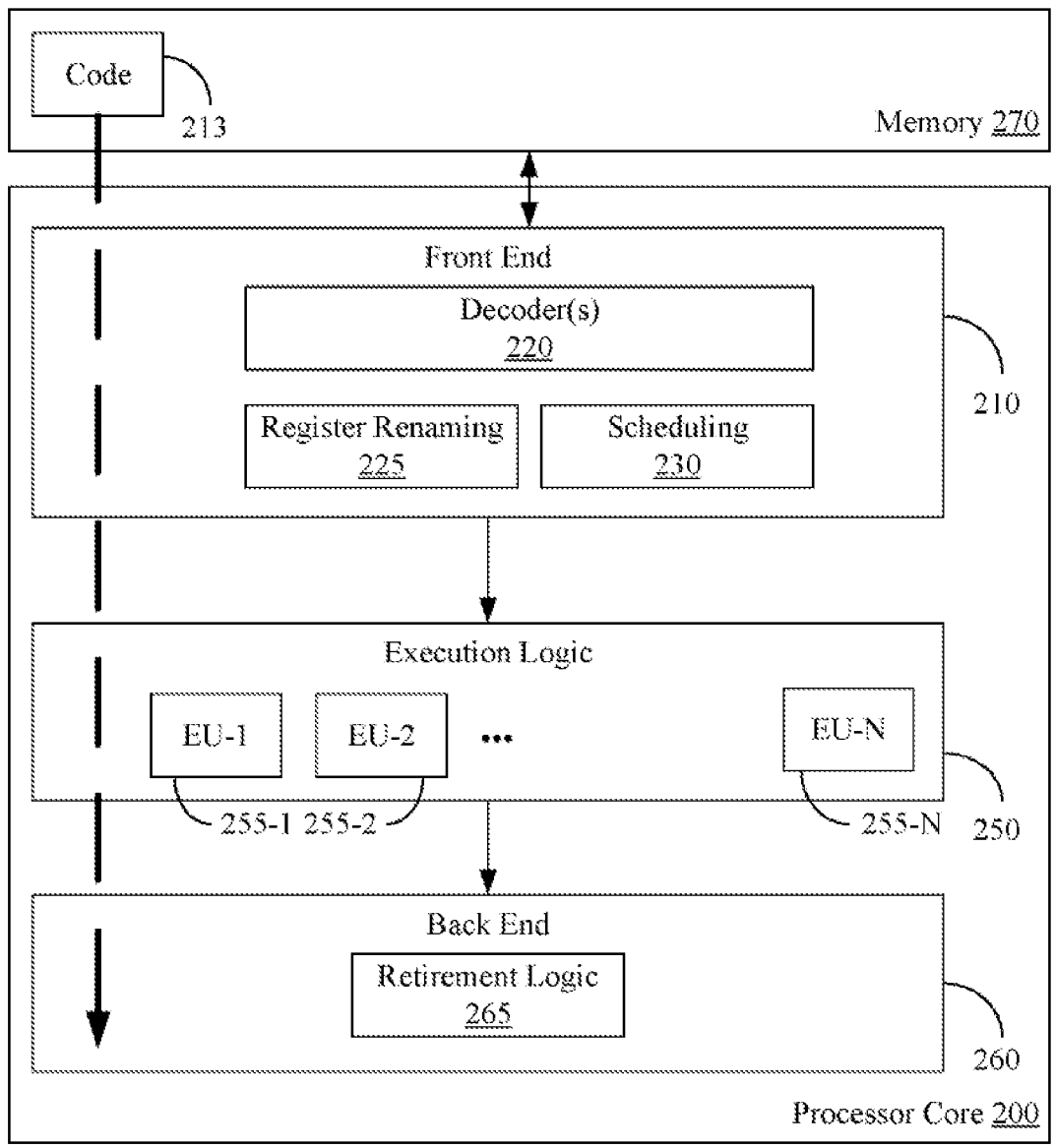
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
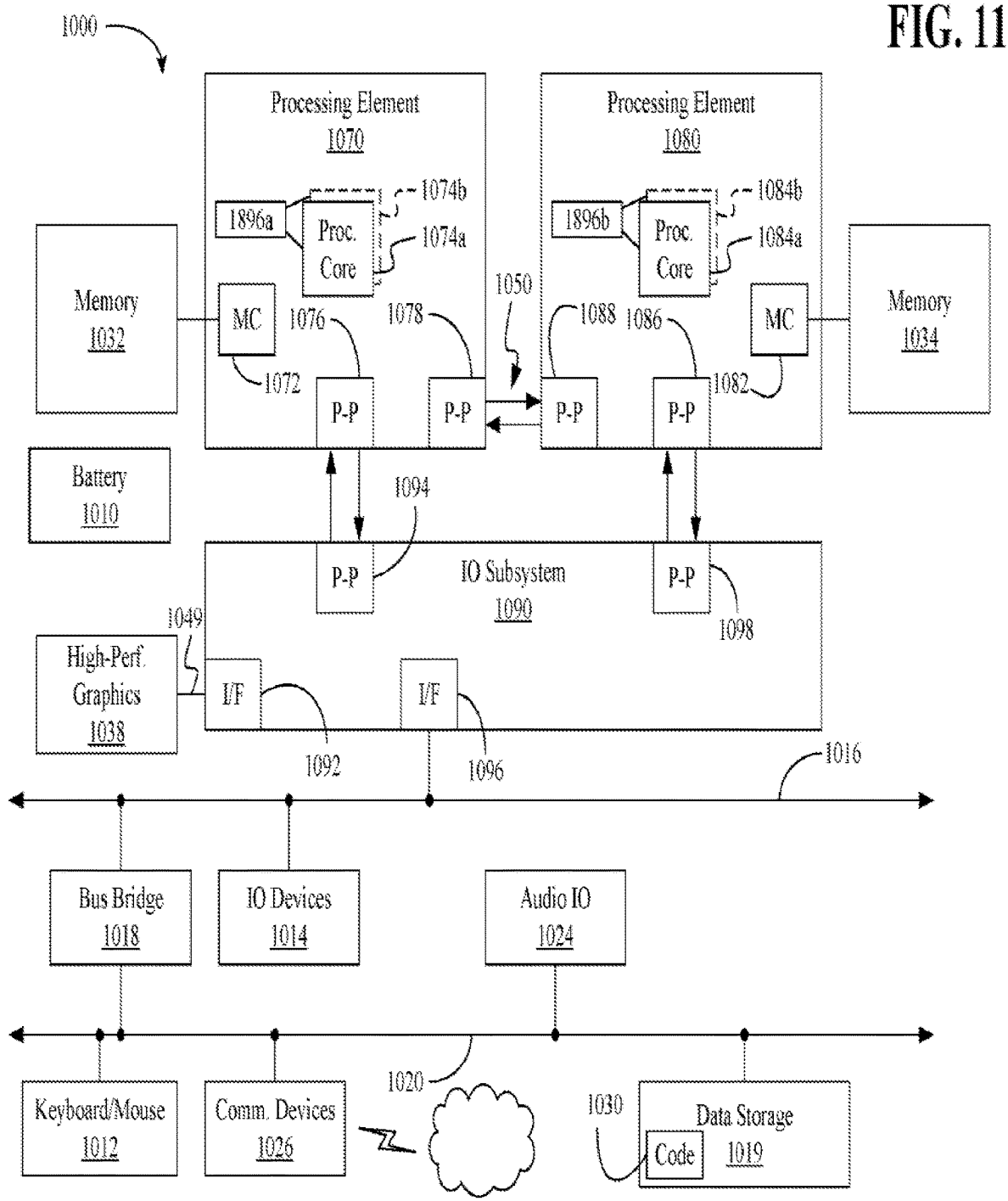
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, one embodiment. The illustrated code 1030 may implement the method 50 (FIG. 4), already discussed, and may be similar to the code 213 (FIG. 10), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 may include a semiconductor apparatus comprising one or more substrates and logic coupled to the one or more substrates, wherein the logic is implemented at least partly in one or more of configurable logic or fixed-functionality hardware logic, the logic coupled to the one or more substrates to generate, by a first neural network, an initial set of model weights based on input data, iteratively generate, by a second neural network, an updated set of model weights based on residual data associated with the initial set of model weights and the input data, wherein the second neural network is to learn one or more motion patterns associated with the input data, and wherein the updated set of model weights are to be generated for a predetermined number of iterations, and output a geometric model of the input data based on the updated set of model weights, wherein the first neural network and the second neural network are to reduce a dependence of the geometric model on a number of data points in the input data.

Example 2 may include the apparatus of Example 1, wherein the updated set of model weights are to be generated further based on one or more of line fitting constraints or data correspondence likelihoods.

Example 3 may include the apparatus of Example 1, wherein the geometric model is to be one or more of a hyperplane fit model, a fundamental matrix estimation model or a homography estimation model.

Example 4 may include the apparatus of Example 1, wherein the logic coupled to the one or more substrates includes transistor channel regions that are positioned within the one or more substrates.

Example 5 may include a system comprising a plurality of cameras to generate input data, a memory coupled to the plurality of cameras, the memory to store the input data, a semiconductor apparatus coupled to the memory, the semiconductor apparatus including one or more substrates and logic coupled to the one or more substrates, the logic coupled to the one or more substrates to generate, by a first neural network, an initial set of model weights based on the input data, iteratively generate, by a second neural network, an updated set of model weights based on residual data associated with the initial set of model weights and the input data, and output a geometric model of the input data based on the updated set of model weights, and a processor to localize the plurality of cameras in a three-dimensional environment based on the geometric model.

Example 6 may include the system of Example 5, wherein the first neural network and the second neural network are to reduce a dependence of the geometric model on a number of data points in the input data.

Example 7 may include the system of Example 5, wherein the second neural network is to learn one or more regularities associated with the input data.

Example 8 may include the system of Example 7, wherein the one or more regularities are to include motion patterns.

Example 9 may include the system of Example 5, wherein the updated set of model weights are to be generated further based on one or more of line fitting constraints or data correspondence likelihoods.

Example 10 may include the system of Example 5, wherein the geometric model is to be one or more of a hyperplane fit model, a fundamental matrix estimation model or a homography estimation model.

Example 11 may include a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate, by a first neural network, an initial set of model weights based on input data, iteratively generate, by a second neural network, an updated set of model weights based on residual data associated with the initial set of model weights and the input data, and output a geometric model of the input data based on the updated set of model weights.

Example 12 may include the apparatus of Example 11, wherein the first neural network and the second neural network are to reduce a dependence of the geometric model on a number of data points in the input data.

Example 13 may include the apparatus of Example 11, wherein the second neural network is to learn one or more regularities associated with the input data.

Example 14 may include the apparatus of Example 13, wherein the one or more regularities are to include motion patterns.

Example 15 may include the apparatus of Example 11, wherein the updated set of model weights are to be generated further based on one or more of line fitting constraints or data correspondence likelihoods.

Example 16 may include the apparatus of Example 11, wherein the geometric model is to be one or more of a hyperplane fit model, a fundamental matrix estimation model or a homography estimation model.

Example 17 may include the apparatus of Example 11, wherein the logic coupled to the one or more substrates includes transistor channel regions that are positioned within the one or more substrates.

Example 18 may include a method comprising generating, by a first neural network, an initial set of model weights based on input data, iteratively generating, by a second neural network, an updated set of model weights based on residual data associated with the initial set of model weights and the input data, and outputting a geometric model of the input data based on the updated set of model weights.

Example 19 may include the method of Example 18, wherein the first neural network and the second neural network reduce a dependence of the geometric model on a number of data points in the input data.

Example 20 may include the method of Example 18, wherein the second neural network learns one or more regularities associated with the input data.

Example 21 may include the method of Example 20, wherein the one or more regularities include motion patterns.

Example 22 may include the method of Example 18, wherein the updated set of model weights are generated further based on one or more of line fitting constraints or data correspondence likelihoods.

Example 23 may include the method of Example 18, wherein the geometric model is one or more of a hyperplane fit model, a fundamental matrix estimation model or a homography estimation model.

Example 24 may include at least one computer readable storage medium comprising a set of instructions, which when executed by a computing system, cause the computing system to perform the method of any one of Examples 18 to 23.

Thus, technology described herein may learn robust geometric model estimators from data in a manner that is practical for high-dimensional problems, fast and stable (e.g., no uncertainty over whether the model is good or bad). The learning-based estimators may yield robust and accurate results on a variety of classic model fitting problems. The technology described herein may be a step towards a modular simultaneous localization and mapping (SLAM) system that combines the power of deep neural networks with mathematically sound geometric modeling. Besides the presented problem instances, the technology described herein is directly applicable to other problems in multiple-view geometry that are based on the Direct Linear Transform, such as triangulation or a perspective-n-point (PnP) problem. Furthermore, the technology described herein may likely be applicable in other problem domains where IRLS is currently employed.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one memory comprising machine-readable instructions to cause at least one processor circuit to at least:
    generate, with a neural network, initial model weights based on image data from a camera in an environment;
    update the initial model weights based on first data and second non-image data to determine updated model weights, the first data associated with the initial model weights, the second non-image data to specify one or more constraints; and
    localize the camera in the environment based on the updated model weights.

2. The at least one memory of claim 1, wherein the neural network is a deep neural network.

3. The at least one memory of claim 1, wherein the camera is mounted on a vehicle.

4. The at least one memory of claim 1, wherein one or more of the at least one processor circuit is included in a localization and mapping system.

5. The at least one memory of claim 4, wherein the localization and mapping system is a simultaneous localization and mapping system (SLAM).

6. The at least one memory of claim 1, wherein the updated model weights are associated with a geometric model, the geometric model associated with the environment.

7. The at least one memory of claim 1, wherein the camera is a first camera, the image data is first image data, and the machine-readable instructions are to cause one or more of the at least one processor circuit to:
    generate the initial model weights based on the first image data and second image data from a second camera in the environment; and
    localize the first camera and the second camera in the environment based on the updated model weights.

8. An apparatus comprising:
    interface circuitry;
    machine-readable instructions; and
    at least one processor circuit to be programmed by the machine-readable instructions to:
        generate, with a neural network, initial model weights based on image data from a camera in an environment;
        update the initial model weights based on first data and second non-image data to determine updated model weights, the first data associated with the initial model weights, the second non-image data to specify one or more constraints; and
        localize the camera in the environment based on the updated model weights.

9. The apparatus of claim 8, wherein the neural network includes a deep neural network.

10. The apparatus of claim 8, wherein the camera is mounted on a vehicle.

11. The apparatus of claim 8, wherein one or more of the at least one processor circuit are included in a localization and mapping system.

12. The apparatus of claim 11, wherein the localization and mapping system is a simultaneous localization and mapping system (SLAM).

13. The apparatus of claim 8, wherein the updated model weights are associated with a geometric model, the geometric model associated with the environment.

14. The apparatus of claim 8, wherein the camera is a first camera, the image data is first image data, and one or more of the at least one processor circuit is to:
generate the initial model weights based on the first image data and second image data from a second camera in the environment; and
localize the first camera and the second camera in the environment based on the updated model weights.

15. A method comprising:
generating, with a neural network, initial model weights based on image data from a camera in an environment;
updating, by at least one processor circuit programmed by at least one instruction, the initial model weights based on first data and second non-image data to determine updated model weights, the first data associated with the initial model weights, the second non-image data specify one or more constraints; and
localizing the camera in the environment based on the updated model weights.

16. The method of claim 15, wherein the neural network includes a deep neural network.

17. The method of claim 15, wherein the camera is mounted on a vehicle.

18. The method of claim 15, wherein one or more of the at least one processor circuit is included in a localization and mapping system.

19. The method of claim 15, wherein the updated model weights are associated with a geometric model, the geometric model associated with the environment.

20. The method of claim 15, wherein the camera is a first camera, the image data is first image data, the generating of the initial model weights is based on the first image data and second image data from a second camera in the environment, and further including localizing the first camera and the second camera in the environment based on the updated model weights.

\* \* \* \* \*

UNITED STATES PATENT AND TRADEMARK OFFICE
CERTIFICATE OF CORRECTION

PATENT NO. : 12,307,579 B2
APPLICATION NO. : 18/482463
DATED : May 20, 2025
INVENTOR(S) : Ranftl et al.

Page 1 of 1

It is certified that error appears in the above-identified patent and that said Letters Patent is hereby corrected as shown below:

In the Claims

Column 21, Line 6 (Claim 11), replace "are" with -- is --

Column 22, Lines 3-4 (Claim 15), replace "data specify" with -- data to specify --

Signed and Sealed this
Twenty-ninth Day of July, 2025

Coke Morgan Stewart
*Acting Director of the United States Patent and Trademark Office*